United States Patent [19]
Robertson

[11] Patent Number: 5,306,037
[45] Date of Patent: Apr. 26, 1994

[54] MOBILE HOME TRAILER UNDER-VEHICLE HITCH

[76] Inventor: Robert L. Robertson, 926 Honeysuckle St., Lowell, Ark. 72745

[21] Appl. No.: 38,495

[22] Filed: Mar. 29, 1993

[51] Int. Cl.$^5$ .............................................. B60D 1/48
[52] U.S. Cl. .................. 280/495; 280/455.1; 280/493; 280/498
[58] Field of Search ............... 280/495, 496, 497, 498, 280/499, 493, 494, 455.1, 482

[56] References Cited

U.S. PATENT DOCUMENTS

| | | | |
|---|---|---|---|
| 2,707,114 | 4/1955 | Martin | 280/496 |
| 2,772,098 | 11/1956 | Seeley | 280/496 |
| 2,780,479 | 2/1957 | Frieberg | 280/499 |
| 2,940,776 | 6/1960 | Curtis | 280/495 |
| 3,306,628 | 2/1967 | Haxton | 280/406 |
| 3,353,842 | 11/1967 | Lewis | 280/499 |
| 3,434,735 | 3/1969 | Bernard | 280/406 |
| 3,556,558 | 1/1971 | McKee | 280/406 |
| 3,601,427 | 8/1971 | Holt | 280/406 |
| 3,801,133 | 4/1974 | Thompson | 280/406 |
| 3,964,767 | 6/1976 | Williams | 280/446 |
| 4,106,794 | 8/1978 | Sallis | 280/456 |
| 4,348,035 | 9/1982 | Wasservogel | 280/495 |
| 4,420,169 | 12/1983 | Taylor | 280/494 |
| 4,832,358 | 5/1989 | Bull | 280/418.1 |
| 5,167,423 | 12/1992 | Hall, Jr. | 280/495 |
| 5,193,837 | 3/1993 | Fink et al. | 280/495 |

FOREIGN PATENT DOCUMENTS 1383448  2/1975  United Kingdom ............... 280/496

OTHER PUBLICATIONS

N. H. Northern, Winter Catalog, 1992, p. 125.

Primary Examiner—Margaret A. Focarino
Assistant Examiner—Kevin Hurley
Attorney, Agent, or Firm—Robert R. Keegan

[57] ABSTRACT

There is disclosed a modular trailer hitch and tow bar having multiple coupling points at which the trailer may be separated from its towing vehicle. The first is a pivoting coupling on a vehicle mount unit near the horizontal axis of the towing vehicle rear wheels. The second coupling is rearwardly displaced from the first and is a sleeve and bar coupling which is normally used to separate the tow bar into a trailer connector unit and a vehicle mount unit. The third coupling is rearwardly displaced from the second and is arranged to conform to the juncture of the bifurcated arms of a conventional travel trailer tongue. The third coupling operates in conjunction with clamps engaging the tongue to form a rigid and rugged joinder of tow bar to trailer tongue arms. A vehicle mounted tow bar holder holds the truck mount unit portion stationary when the tow bar is disconnected at the second coupling. In one embodiment the tow bar forward of second coupling is telescopically adjustable to allow for different vehicular lengths.

15 Claims, 4 Drawing Sheets

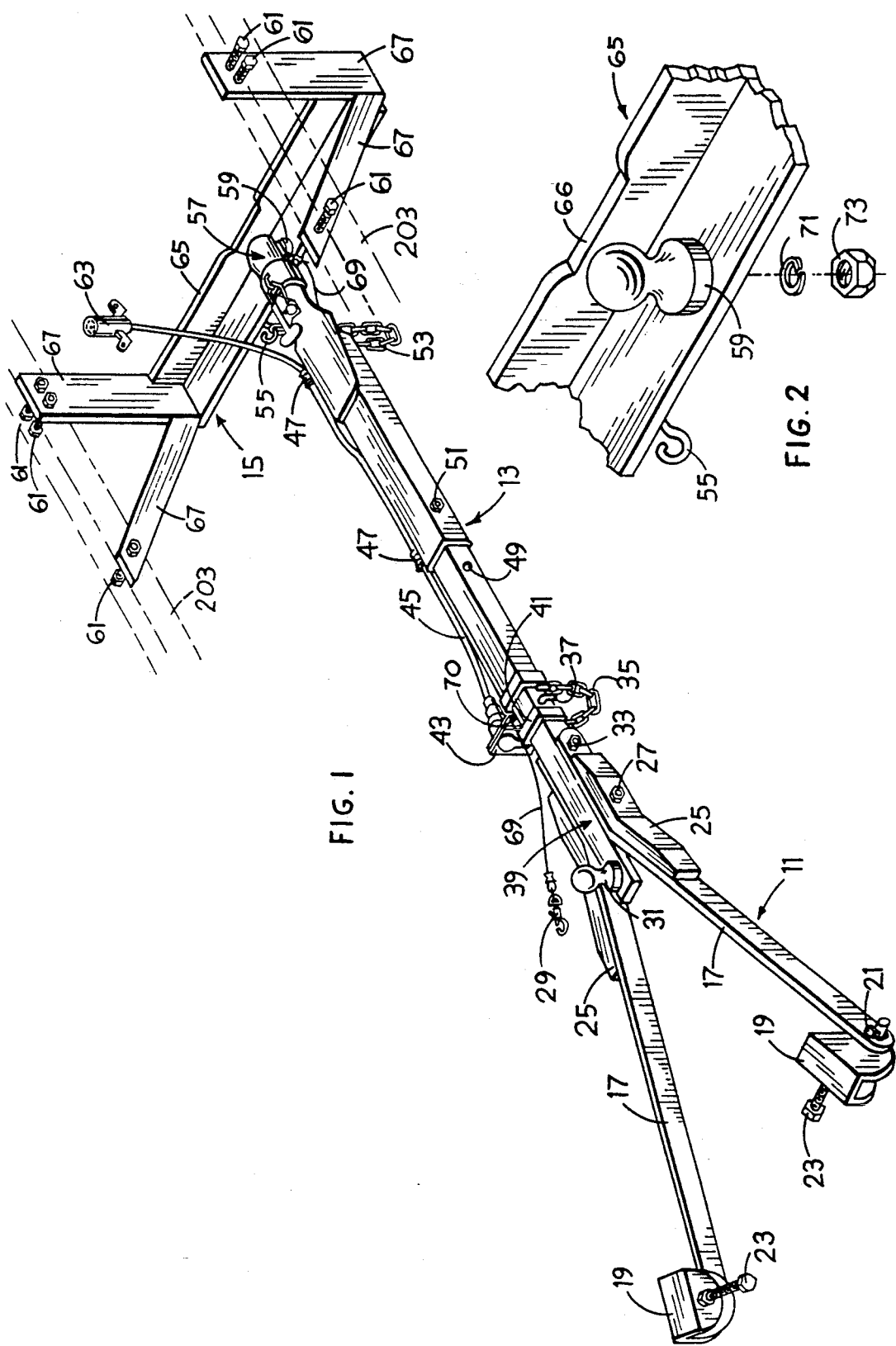

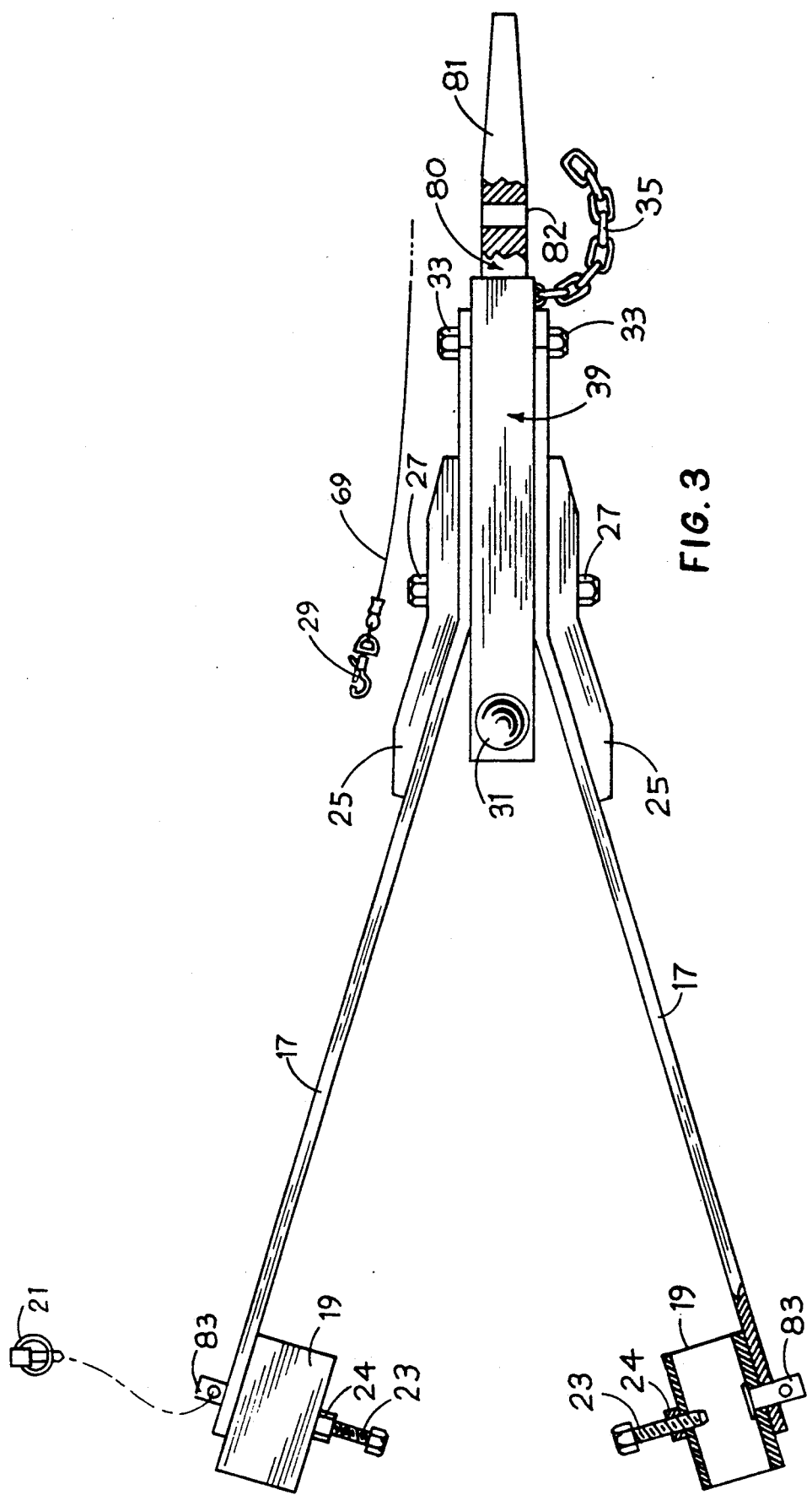

MOBILE HOME TRAILER UNDER-VEHICLE HITCH

BACKGROUND OF THE INVENTION

The present invention relates to an under-vehicle trailer hitch and tow bar having a coupling point near the position of vehicle rear bumper at which the trailer may be separated from its towing vehicle. The invention transfers the pivot point of the tow bar from near the rear bumper of the towing vehicle to the position of the axis of the rear wheels. The prior art does include various tow bars which are designed to attach to the towing vehicle near the rear wheels axis of the towing vehicle to provide greater control of the trailer and thereby a greater degree of safety. Some prior art devices which have attempted to solve the problem of accessibility of the coupling and uncoupling procedure for a coupling point located near or above the rear axle of the towing vehicle include gooseneck and fifth wheel-type hitches. However, these attempts at solving the placement and accessibility problems have resulted in substantial and unsightly modifications to the towing vehicle as well as the loss of the use of a substantial amount of the space of the towing vehicle. Additionally, these prior art devices cannot be used on vehicles which have no open bed in which their mounts can be placed. This leaves a large category of vehicles in which the typical gooseneck and fifth wheel hitch cannot be used. The present invention overcomes the difficulties associated with these types of hitches, and, also attaches to the towing vehicle with a minimal reduction of the towing vehicle normal utility. Prior trailer hitches and tow bars have also suffered from problems associated with transferring the trailer weight-bearing point to a location adjacent to the axis of the rear wheels of the towing vehicle.

These problems include the difficulty with which the trailers and towing vehicles were coupled and uncoupled, together with the problems associated with the different rear bumper-to-axle distance on different towing vehicles. The present invention overcomes both these difficulties in that it provides a convenient coupling and uncoupling procedure with the coupling near the rear bumper of the towing vehicle and easily accessible by the operator.

In certain embodiments the invention also accommodates different sizes of towing vehicles in that it is adjustable in its total horizontal length.

SUMMARY OF THE INVENTION

The present invention is directed to a trailer hitch and tow bar having multiple attachment points, at least one of which permits the trailer to conveniently be separated from its towing vehicle. The first is a pivoting attachment on a vehicle mount unit near the horizontal axis of the towing vehicle rear wheels. The second is rearwardly displaced from the first and is a sleeve and bar coupling located near the vehicle rear bumper which permits the tow bar to separate as a trailer connector unit and a vehicle mount unit. The third attachment is rearwardly displaced from the second and is located at the juncture of the bifurcated arms of the standard trailer tongue assembly. The third attachment operates in conjunction with clamps which engage the end of each of the bifurcated arms to form a rugged and rigid connection.

In addition to providing the advantages and features described above, it is an object of the present invention to provide a vehicularly mounted tow bar holder which holds the truck mount unit portion of the tow bar of an under-vehicle trailer hitch stationary when the tow bar is not in use.

Another object of the present invention is to provide an under-vehicle trailer hitch with a telescopically adjustable tow bar which accommodates different vehicles having different lengths between the rear axle and bumper portion of the vehicle.

The foregoing and other objects, features and advantages of the invention will be apparent from the following more particular description of a preferred embodiment of the invention and the accompanying drawings.

BRIEF DESCRIPTION OF THE DRAWINGS

FIG. 1 is a perspective of an under-vehicle trailer hitch according to the invention including a frame mountable under a pickup and electric cable harness;

FIG. 2 is a detailed fragmentary perspective view of the truck mount frame and ball;

FIG. 3 is a top plan of the trailer connection unit portion of the apparatus of FIG. 1;

DETAILED DESCRIPTION OF THE INVENTION

Figure 6:
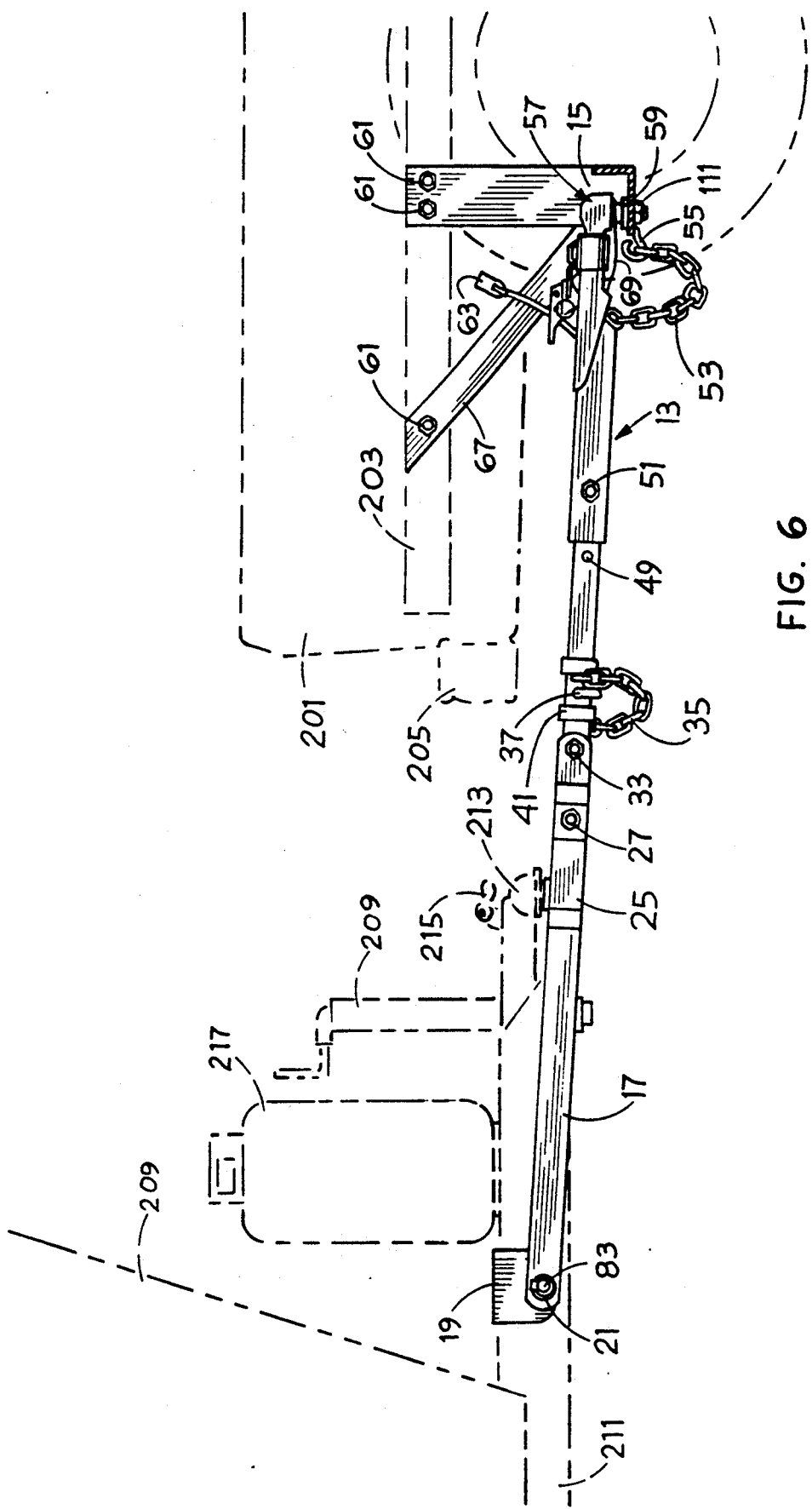
FIG. 6 is a side elevation of an entire under-vehicle hitch system showing its relation to a truck and trailer.

Referring to the drawings in detail, FIGS. 1 and 6 show a modular trailer hitch and tow bar having multiple coupling points. The first coupling point is a pivoting coupling point on mount frame 15 formed by ball and socket hitch 57.

The vehicle mount unit is attached to the frame undercarriage 203 of the towing vehicle 201 (shown in phantom lines) with frame mount bolts 61. The vehicle mount frame 15 consists of a steel frame mount cross member 65 and steel frame mount arms 67 which are preferably permanently joined by welding or other suitable means. Differential notch 66 is provided to allow for the mounting of the vehicle frame mount unit very near the rear differential of the towing vehicle 201. Frame mount cross member 65 and frame mount arms 67 are preferably formed of high strength steel stock approximately one-half inch thick or otherwise constructed with sufficient strength and ruggedness to maintain structural integrity under a trailer load of several tons of draw bar force. Vehicle frame mount hook 55 is provided to allow for the engagement of tow bar safety chain 53, as required by safety regulations. The conventional emergency trailer brake cable 69 can also be attached to the vehicle frame mount hook 55 or other convenient location. Vehicle ball 59 is mounted to vehicle mount frame 15 to provide a coupling for a commercially available hitch 57 such as a Bulldog brand hitch. It should be pointed out that the ball-and-socket coupling herein described could be any coupling known in the art. Alternatively, the tow bar could be permanently attached at this point.

The trailer hitch and tow bar is designed to be uncoupled at the first coupling point only sparingly to provide greater flexibility of operation. The majority of coupling and uncoupling of the tow bar is designed to be done at the second coupling point, consisting of a sleeve 41 and bar 80 (also referred to as hitch mounts and hitch receivers respectively); these can be more clearly seen in FIGS. 3 and 4. Through-holes 38 and 82 allow sleeve pin 37 to lock and unlock this sleeve and bar coupling. The uncoupling operation is a relatively simple procedure. The operator can simply remove sleeve pin clip 93 and then remove sleeve pin 37. The sleeve 41 will then slidably disengage the bar coupler 80. Coupling proceeds in the reverse procedure. Sleeve pin clip 93 retains sleeve pin 37 in position during use. Trailer connector unit safety chain 35 provides an additional safety attachment at this coupling point.

Bar 80 is rigidly and fixedly secured to rear tow bar element 39 by bolt and nut fasteners 33 and 27 or by other suitable fastening means. Bolts and nuts of fasteners 27 and 33 are of appropriate size and strength to provide secure attachment of these and other elements. They may for example be three-quarter inch diameter high strength locking bolt and nut fasteners.

Also secured to tow bar rear element 39 are V-arms 17 which preferably are strengthened by V-arm supports 25. It should be understood that this particular fabrication method for the apparatus is exemplary only and that any of the means such as welding, bolting or the like could be substituted by bolting, welding, riveting, or any other form of fabrication, as is well known.

A ball 31 for a conventional ball hitch is secured to rear element 39 as shown in FIG. 3. Ball 31 may be of any one of several standard sizes and may be secured in place in a manner similar to that shown for ball 59 in FIG. 2.

Arms 17 are provided with rear brackets 19 secured at the extremities thereof and positioned to fit on and clamp to a conventional travel trailer tongue 211, as shown for example in FIG. 6. By way of example, brackets 19 may be pivotally, but firmly, secured to arms 17 by headed studs 83 and bracket clips 21, and may be provided with clamping screws 23 adapted to be tightened against the trailer tongue by rotation in nuts 24 welded or otherwise secured to bracket 19. As best shown in FIG. 3, the pivotal connection of bracket 19 to arm 17 may be accomplished with a headed stud 83 thereby allowing for complete removal of bracket 19 when bracket clip 21 is removed from stud 83. The rear brackets 19 attach to the extending portion of trailer tongue 211 by means of clamp screw 23 which is held in place by clamp screw nut 24 permanently attached to rear bracket 19. Once again, it would be possible to substitute any other coupling which would hold the trailer connector unit rigid against the trailer.

As explained above it will be seen that a third coupling is rearwardly displaced from the second and consists of a standard trailer hitch ball 31 operating in conjunction with V-arms 17 and clamps 19.

Figure 4:
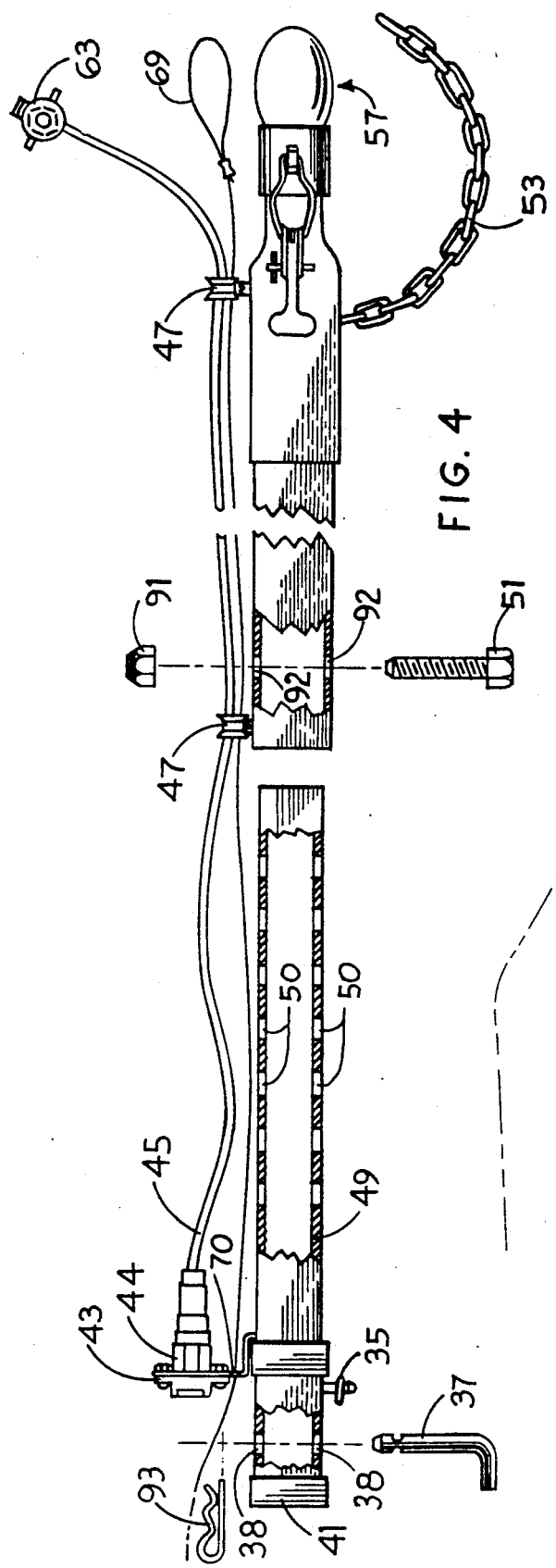
FIG. 4 is a top plan of the forward ball hitch and pickup frame portion of the apparatus of FIG. 1.
Figure 5:
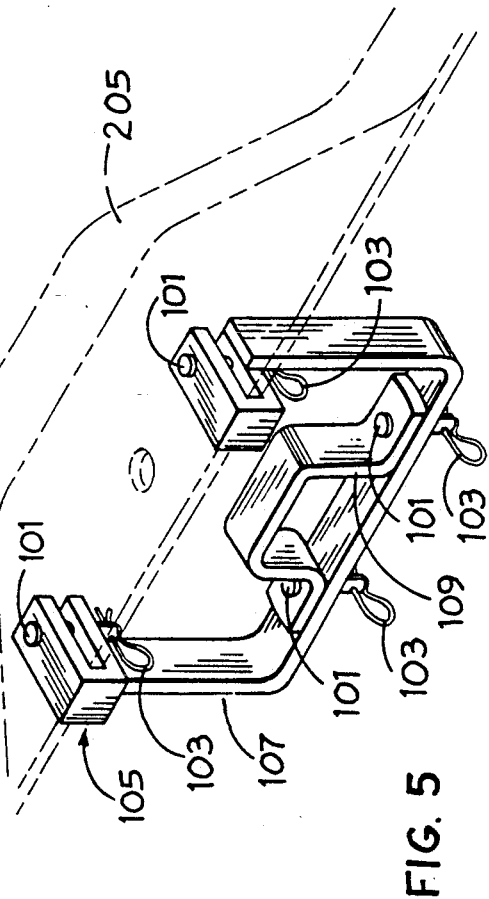
FIG. 5 is a perspective of a bumper-mountable tow bar holder bracket.

As can be seen in FIGS. 1, 3, and 4, a conventional emergency trailer brake cable 69 passes from its attachment at ball 59 alongside the tow bar extender 13 and through a brake cable hole 70 in wiring harness housing 43; cable 69 terminates in a conventional brake cable latch 29 for attachment to the trailer brake system (not shown). As can be seen in FIG. 6, the attachment of the trailer connector unit 11 with ball 31 in a conventional trailer ball socket 213 with locking lever 215 and rear brackets 19 will hold the trailer connector unit 11 rigidly and firmly in position during towing and when the tow bar is separated into a trailer connector unit 11 and a vehicle mount unit 49. Tow bar extender 13 when not in use is held in place by tow bar holder 109 shown in FIG. 5.

Tow bar holder frame 107 is removably mountable on towing vehicle bumper 205. Tow bar holder bumper mount 105 fits around bumper 205 and tow bar holder pins 101 extend through holes in bumper mount 105 and bumper 205 and are held in place by holder clips 103. Tow bar retainer 109 also is preferably mounted on the tow bar holder frame 107 by tow bar holder pins 101 retained by holder clips 103. This arrangement allows tow bar retainer to be removed when coupling vehicle and trailer to facilitate positioning of sleeve opening 41 to receive taper 81. This allows the unassisted vehicle driver to back the vehicle to the approximate position for coupling the trailer, to move the slave laterally and raise or lower the trailer tongue to align the sleeve 41 and taper 81. Thereafter the drive returns to the vehicle cab and backs a short distance to engage the taper in the sleeve 41, where it is secured by pin 37.

As can be seen in FIG. 6, pivotal movement of the tow bar is allowed at the first coupling point between Bulldog hitch 57 and vehicle ball 59. This pivotal movement is confined in the horizontal axis, or left-right by the towing vehicle tires 207 and the vehicle frame mount arms 67. Theoretically this horizontal pivotal movement could be as great as 180°; in practive it should be at least about 60°. The vertical or up/down unrestrained movement of the tow bar (primarily limited by the towing vehicle bumper 205) is preferably at least about 6°.

As can be seen from FIGS. 1 and 4, brake and turn light signals are transmitted from the towing vehicle 201 to the trailer 209 via a conventional or extended-length wiring harness 45. The wiring harness vehicle connector 63 is connected to the towing vehicle 201 in a standard manner and signals are transmitted through wiring harness 45 to the wiring harness plug 44. Plug 44 is attached to the tow bar by a plug retainer 43 and the wiring harness preferably is attached to the tow bar at multiple points by wiring harness brackets 47. The standard trailer connection preferably is made at wiring harness plug 44 rather than at the vehicle bumper.

While the invention has been particularly shown and described with reference to preferred embodiments thereof, it will be understood by those skilled in the art, that various changes in addition to those suggested herein may be made therein without departing from the spirit and scope of the invention.

What is claimed is:

1. Trailer hitch apparatus, particularly for a travel trailer drawn by a pickup truck having a rear bumper, an underframe and rear wheels with a common axis, comprising:

a mount frame adapted to be secured to an underframe of said pickup truck between said rear wheels near said rear wheels axis;

a tow bar having an elongated forward element and an elongated rearward element, said forward element having a length at least sufficient to reach from the position of said mount frame to the rearmost portion of a pickup truck;

a ball and socket joint for coupling said forward element to said mount frame midway between said rear wheels with at least 60 degrees of left-right freedom of pivotal movement and at least 6 degrees of up-down freedom of pivotal movement;

means for detachably joining said rearward element to said forward element in rigid colinear fashion said means including a tapered arm on one of said elements and a mating sleeve on the other of said elements; and means for temporarily securing said forward element to said pickup truck to restrict movement thereof relative to said bumper when said rearward element is detached;

said rearward element including a trailer connector unit having a ball for engaging a trailer hitch ball socket and having fastening means for fixedly securing at least two other positions on said connector unit to corresponding positions on a conventional travel trailer tongue and hitch structure;

whereby said apparatus, when said rearward element is joined to said forward element, provides an anti-sway coupling for said travel trailer with a load transfer and pivot point very close to the position of the rear wheels axis, and whereby detachment and reattachment of said elements is conveniently accomplished by a vehicle driver without second person assistance or access to the underside of the pulling vehicle.

2. Apparatus as recited in claim 1 wherein said trailer connector unit rear portion is bifurcated to form two extensions conforming to the shape of a conventional travel trailer tongue and each extension has a coupling near the end thereof for securing it to a conventional travel trailer tongue.

3. Apparatus as recited in claim 2 wherein said extensions are spaced apart in a manner to accommodate a conventionally placed liquefied gas fuel tank on a travel trailer tongue.

4. Apparatus as recited in claim 1 wherein said forward element is formed of two telescoping tubular metal bars and includes means for adjustably fixing the positions thereof to adjust the length of said forward element.

5. Apparatus as recited in claim 1 further including a tow bar holder adapted to be connected to the rear of a vehicle which holder includes means to support said forward element in a near horizontal position.

6. Apparatus as recited in claim 1 further including a trailer brake cable and guide means for said cable secured on said elongated forward element.

7. Apparatus as recited in claim 1 wherein said ball and socket joint is a conventional ball and socket trailer hitch device.

8. Apparatus as recited in claim 1 wherein said means for fixedly securing positions on said connector unit to corresponding positions on a conventional travel trailer tongue includes U-clamp members adapted to clamp over the top of a conventional travel trailer tongue structure thereby positively transferring the weight load of the trailer to said rearward element and said tow bar.

9. Trailer hitch apparatus for a trailer to be drawn by a vehicle having a rear bumper, an underframe and rear wheels with a common axis comprising:

a mount frame adapted to be secured to an underframe of said vehicle near said rear wheels axis;

a tow bar having an elongated forward element and an elongated rearward element, said forward element having a length at least sufficient to reach from the position of said mount frame to said rear bumper;

means for coupling said forward element to said mount frame with at least 60 degrees of left-right freedom of pivotal movement and at least 6 degrees of up-down freedom of pivotal movement, said means for coupling said forward element to said mount frame being a ball and socket joint;

means for securing said forward element to restrict movement thereof relative to said bumper when said rearward element is detached;

means for detachably joining said rearward element to said forward element in rigid colinear fashion, and said rearward element including a trailer connector unit having fastening means for fixedly securing at least three positions on said connector unit to corresponding positions on a conventional trailer tongue and hitch structure;

whereby said apparatus, when said rearward element is joined to said forward element, provides an anti-away coupling for said travel trailer with a load transfer and pivot point very close to the position of the rear wheels axis, and whereby detachment and reattachment of said elements is conveniently accomplished without special tools or access to the underside of the pulling vehicle.

10. Apparatus as recited in claim 9 wherein said trailer connector unit is bifurcated to form two rearward extensions conforming to the shape of a conventional travel trailer tongue and each extension has a coupling near the end thereof for securing it to a conventional travel trailer tongue.

11. Apparatus as recited in claim 10 wherein said extensions are spaced apart in a manner to accommodate a conventionally placed liquefied gas fuel tank on a travel trailer tongue.

12. Trailer hitch apparatus for a trailer to be drawn by a vehicle having a rear bumper, an underframe and rear wheels with a common axis comprising:

a mount frame adapted to be secured to an underframe of said vehicle near said rear wheels axis;

a tow bar having an elongated forward element and an elongated rearward element, said forward element having a length at least sufficient to reach from the position of said mount frame to said rear bumper; said forward element being formed of two telescoping tubular metal bars and including means for adjustably fixing the positions thereof to adjust the length of said forward element;

means for coupling said forward element to said mount frame with at least 60 degrees of left-right freedom of pivotal movement and at least 6 degrees of up-down freedom of pivotal movement.

13. Apparatus as recited in claim 12 further including a tow bar holder adapted to be connected to the rear of a vehicle which holder includes means to support said forward element of said tow bar in a near horizontal position.

14. Trailer hitch apparatus, particularly for a travel trailer drawn by a pickup truck having an underframe and rear wheels with a common axis, comprising:

a mount frame adapted to be secured to an underframe of said pickup truck near said rear wheels axis;

a tow bar having an elongated forward element and an elongated rearward element, said forward element having a length at least sufficient to reach from the position of said mount frame to the rearmost portion of a pickup truck;

means for coupling said forward element to said mount frame with at least 60 degrees of left-right freedom of pivotal movement and at least 6 degrees of up-down freedom of pivotal movement;

said forward element being formed of two telescoping tubular metal bars and including means for adjustably fixing the positions thereof to adjust the length of said forward element; and means for detachably joining said rearward element to said forward element in rigid colinear fashion;

said rearward element including a trailer connector unit having fastening means for fixedly securing at least three positions on said connector unit to corresponding positions on a conventional travel trailer tongue and hitch structure;

whereby said apparatus, when said rearward element is joined to said forward element, provides an anti-sway coupling for said travel trailer with a load transfer and pivot point very close to the position of the rear wheels axis, and whereby detachment and reattachment of said elements is conveniently accomplished without special tools or access to the underside of the pulling vehicle.

15. Apparatus as recited in claim 14 further including a tow bar holder adapted to be connected to the rear of a vehicle which holder includes means to support said forward element in a near horizontal position.

* * * * *